Patented Mar. 10, 1931

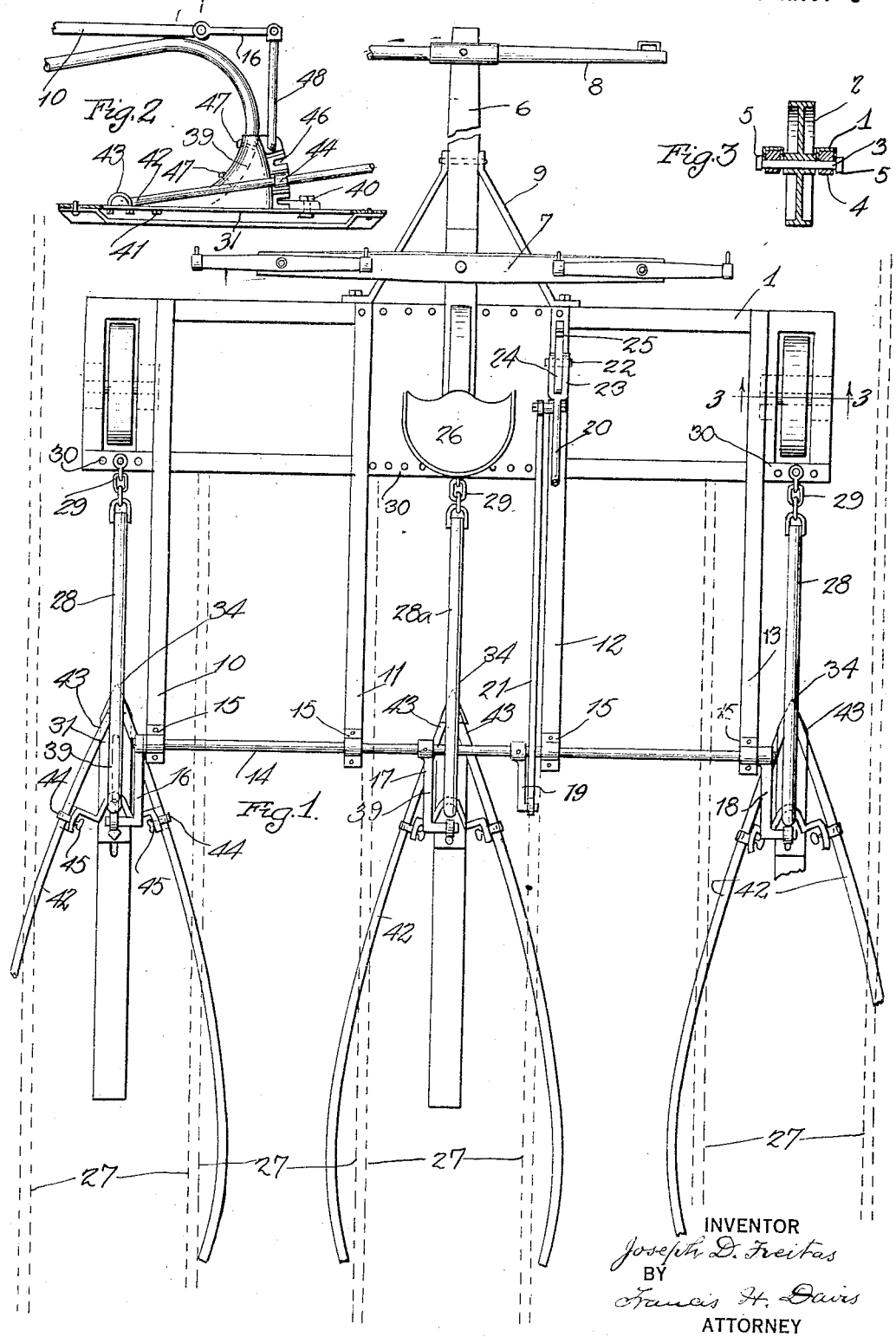

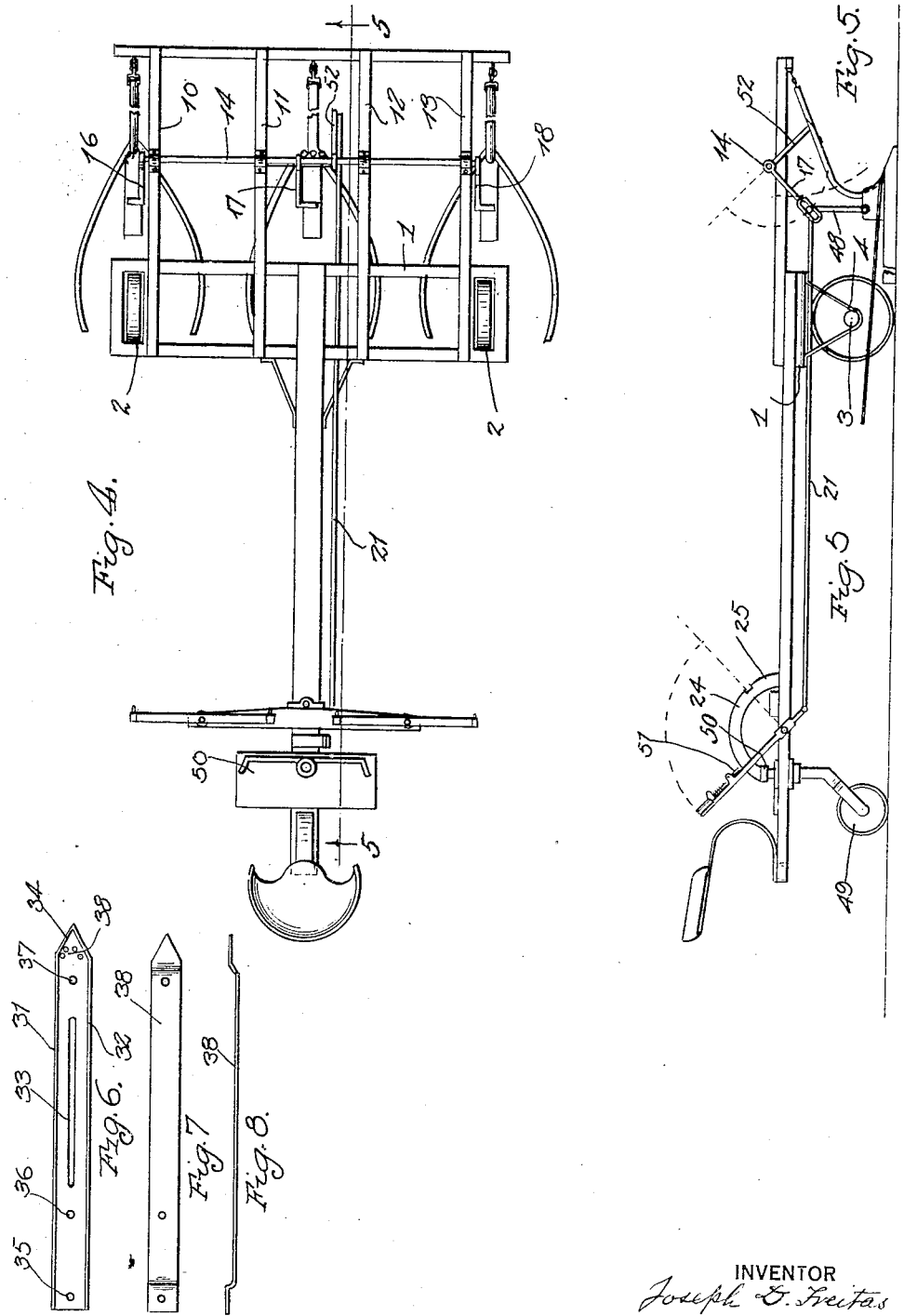

1,796,095

UNITED STATES PATENT OFFICE

JOSEPH D. FREITAS, OF MARINA, CALIFORNIA

AGRICULTURAL COMB

Application filed May 24, 1928. Serial No. 280,322.

My invention relates to agricultural implements and more particularly to a combination apparatus adapted to be traversed along between rows of legumes and other crops having runners or tendrils with a tendency to intertwine or mat together so as to be a hindrance to the efficient cultivating or harvesting thereof.

I may here state that by the use of my implement (hereinafter referred to as a whole by the term "comb") I am enabled to keep the rows of peas, beans or similar crops in good tilth, free from weeds and with each individual row separate and distinct from the others. Heretofore great loss has accrued from insufficient cultivation and weeding, whereby lighter yields have resulted. So far as I am aware the most that has been done in this relation hitherto has been to walk along between two rows with a pole to separate the runners, a tedious and costly operation; whereas, by the use of my comb, which may be made up of multiple units, I provide a riding implement capable of combing several rows at one traversing, thereby effecting a great having in time, money and the attainment of a better job.

An object of my invention is to provide an implement that may be either drawn or pushed along in the rows of growing crops so as to disentangle the members of the relative rows.

Another object is to provide a vehicle adapted either to propel or to draw a multiple comb between the rows of standing crops.

A further object is to provide comb units adapted to be drawn between such rows and spread the plant members apart.

A very important object of my invention is to provide a sole-piece adapted to act as a runner after the manner of a sled runner, said runner provided with a point suitable to make a way through weeds or the like and glide along the surface without digging in, and, further provided at a suitable distance back from said point with pivotal means for the attachment thereto of certain spreader means more fully to be described.

Another object is to provide a member carried by said sole-piece, said member being adapted for axial adjustment longitudinally of said sole-piece relative to said pivotal means and having regulative means for said adjustment.

A further object is to provide certain sweeps carried in pivotal relation to said pivotal means, said sweeps being adjustably interrelated with said member with respect to their spread apart and elevation above the horizontal plane at the free ends thereof.

An important object is to provide means for elevating said comb units a suitable distance from the ground when turning headlands or when going from place to place.

My invention has other novel and useful objects that will be more fully described in connection with the accompanying drawings, and which will be more fully pointed out in and by the appended claims.

In the drawings:

Figure 1 is a plan view of my comb implement adapted to be drawn by animal or other suitable power.

Fig. 2 is a detail showing the sole-piece in longitudinal section, the beam and related parts.

Fig. 3 is a section taken on the line 3—3 of Fig. 1.

Fig. 4 is a plan view of my comb implement adapted to be pushed forward by animal or other suitable power.

Fig. 5 is a sectional view taken on the line 5—5 of Fig. 4.

Fig. 6 is an underneath view of the sole-piece.

Figs. 7 and 8 show a plan and edge views respectively of the sole-piece cover.

Similar reference characters refer to similar parts throughout the several views.

In the drawings 1 represents a vehicular frame carried by the wheels 2 mounted on the axles 3 retained in the boxings 4 by the collars 5.

By reference to Fig. 1 the pole 6 is shown crossing said frame from front to back, projecting medially forward therefrom and as being provided with the double-tree 7, neck-yoke 8 and the hounds 9 which provide rigid lateral support for said pole.

Rigidly attached to the upper surface of said frame and suitably spaced apart are the supporting members 10, 11, 12, and 13 which project backwardly from said frame 1 for an even distance therefrom for the support of the shaft 14 mounted in the bearings 15. Now fixed to said shaft and projecting generally backward and downward therefrom are the cranks 16, 17 and 18, whereas the crank 19 is set on said shaft so as to project in a general upward and backward direction and being adapted to describe an upward-forward arc when acted upon by forward movement of the lever 20 being linked thereto by the rod 21. Said lever is pivotally connected to the support member 12 at 22, said lever having the jaws 23 bridging an arcuate member 24 provided with a notch 25 for a purpose to be explained and with a latch member adapted to co-act therewith similar to that shown in Fig. 5. Said lever 20 is within easy reach of a driver when in the seat 26.

The comb units

By reference to Fig. 1 it is seen that the wheels 2 run in the row spaces 27. The beam 28 of each unit is flexibly attached to the rear of the frame 1, preferably by the well known clevis and the few links of chain designated 29 which is easily removable and admits of a certain necessary range of universal play which adapts itself to surface inequalities and is necessary for another purpose to be explained, said frame being provided with holes as 30 for lateral adjustment to accommodate said units to rows of varying widths. Comb units comprising the sole-piece 31 preferably of channel-like construction are adapted to run with the webs 32 down, having the longitudinal slot 33, the pointed end 34, the holes drilled therethrough 35, 36 and 37 (well shown in Fig. 6) for the bolts obviously needed to secure the cover 38 (Figs. 7 and 8) in position within the cavity of the sole-piece 31 so as to form a cover therefor and to present a smooth under surface for said unit to run on. Mounted on the upper surface of said piece 31 is the novel member 39 being secured thereto by means as the bolts or studs 40—41 adapted to be locked in regulative adjustment relative to the point 34 by the nuts 40—41 after said member has been moved to or fro in the slot 33 to effect the required adjustment of said member for a purpose, later to appear.

Said member 39 is preferably a casting of peculiar shape and adapted to function in a peculiar manner, best understood by reference to Fig. 2 wherein the sweep 42 is seen to be loosely connected to the piece 31 by what for the purpose of illustration is shown as the staple 43 but which could obviously be attached by other means. A pair of sweeps is provided and extend backwardly and upwardly from said staple 43 one on each side of the sole-piece 31, the sweeps being preferably formed of a piece of one inch pipe flattened at the forward end thereof and drilled so as to be a loose fit on said staple 43. The sweeps are bent to a curve approximately as represented in Fig. 1 and of appropriate length for the purpose intended. Each sweep 42 is provided with a clamp 44 that has a sleeve portion adapted to be a slip-fit on said sweep and provided with a screwthreaded shank 45 adapted to engage the slots 46 for the elevational adjustment of said sweeps with relation to said staple 43 so as to adapt the height of said sweeps to comb plant rows of various stages of growth; whereas, adjustment to rows of various widths is obtained by longitudinal adjustment of the member 39 with relation to the point 34. In other words, the farther forward said member 39 is advanced toward said point the wider will be the spread of said sweeps and vice versa.

The beam 28 may well be formed of a piece of pipe or other structural form bent into the required shape which may be either socketed into the member 39 or removably attached thereto by bolts as 47 (Fig. 2) having means for connection at the free end with the flexible connection means 29 for attachment of said unit to the frame 1, there being link means as 48 connecting said members 39 with the cranks 16, 17 and 18. It is to be observed however, that the beam 28a rides over the shaft 14 at a sufficient height to clear the same taking into account irregularities of ground surface.

The foregoing relates to my implement as adapted to be drawn. I will now describe my implement as being adapted to be pushed forward which may easily be effected by changing the position of the seat 26, the doubletree 7, the provision of the third wheel 49, the foot-tiller 50, the changed location of the lever elements 22, etc., and a few obvious changes.

In this changed relation the comb units enter the crop ahead of the implement and horses which is advantageous as tending to do less injury to the growing plants.

In operation with either the drawn or the propelled implement the object is to traverse comb units lengthwise of rows of crops, said combs being provided with sweeps set taperingly so that their free ends shall be relatively wider apart than the width of said crop rows.

When passing along such rows the action of the combs is to part the interlocked tendrils, runners, vines or matted vegetation and lie them over clear of opposing rows.

It should be observed that in both forms of my invention the cranks 16, 17 and 18 are disposed backwardly and are adapted to vibrate up and down when traversing irregular surfaces, the lever 20 vibrating to and fro in unison therewith under action of the rod 21, furthermore, that the arcuate member 24 (well shown in Fig. 5) is provided with but one notch 25 for engagement with the latch 51, by reason that the only time such engagement is necessary or desirable is when turning headlands or when traveling from place to place. At such times, by reference to Fig. 5, it is seen that when said lever 20 is thrown forward so that said latch engages said notch the rod 21 acts on the crank 52 to rotate shaft 14 through an angle of 45 degrees which in turn acts upon the link 48 for the elevation of said comb pivoting from the point or flexible connection 29.

It is obvious that by lifting the combs and by careful handling of the lines and use of the tiller 50 the implement may be very readily turned completely round without damage to either the implement or the crop.

It is believed that the construction, operation and advantages of the invention will now be clearly understood. The present embodiments of the invention have been disclosed in detail merely by way of example, since in actual practice they attain the features of advantage set forth as being desirable in the statement of the invention and the above description.

Numerous changes in the details of construction, and in the combination and arrangement of parts may be resorted to without departing from the spirit or scope of the invention as hereinafter claimed or sacrificing any of its advantages.

Having thus described my invention, what I claim as new is,—

1. In an implement of the kind described, a vehicular frame and means for power attachment thereto, comb units or unit carried thereby, said units comprising a sole-piece, sweeps forwardly attached to said piece, a displaceable member carried by said piece, means for regulative adjustment of said member on said sole-piece in longitudinal relation thereto and a beam element attached to said member provided with means for attachment to said frame.

2. In an implement of the kind described, a vehicular frame having means for power attachment thereto, comb units or unit carried thereby and comprising elongated free ended tines, said unit provided with a channeled sole-piece adapted to run with the flat side up, a slot means provided in said piece, a displaceable member carried by said piece and engaging means for locking said piece and said member together at requisite points of said slot.

3. An implement of the kind described, comprising in combination, a vehicular frame interrelated comb units comprising elongated, rearwardly extending tines, said tines regulatively adjustable in relation to a sole-piece and to a member carried thereby, linked connection from said member to a crank shaft carried by the frame and means to actuate said crank shaft, said parts constituting a means for elevating or depressing said units in relation to the ground surface.

4. In an implement of the kind described having a vehicular frame and means for power attachment thereto, one or more comb units comprising divergent elongated tines constituting sweeps conveyed thereby, said unit comprising a channel-like sole-piece provided with a medial longitudinal slot, a displaceable member carried on the upper surface of the sole-piece, screw-threaded means projecting from said member through said slot, locking means adapted for said projecting means and a cover for said means.

In testimony whereof I have set my hand to this specification this 14th day of May, 1928.

JOSEPH D. FREITAS.